Patented June 10, 1941

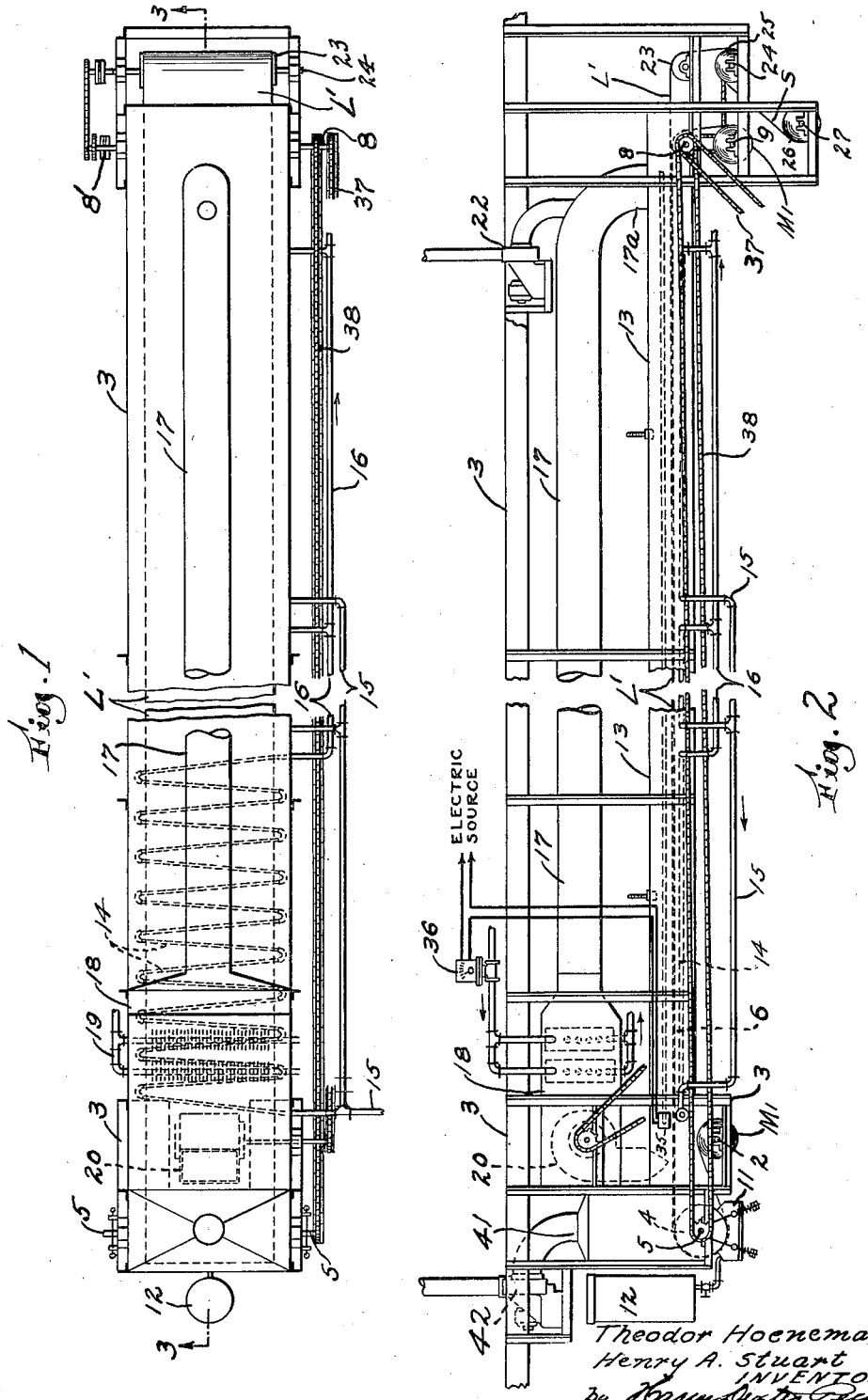

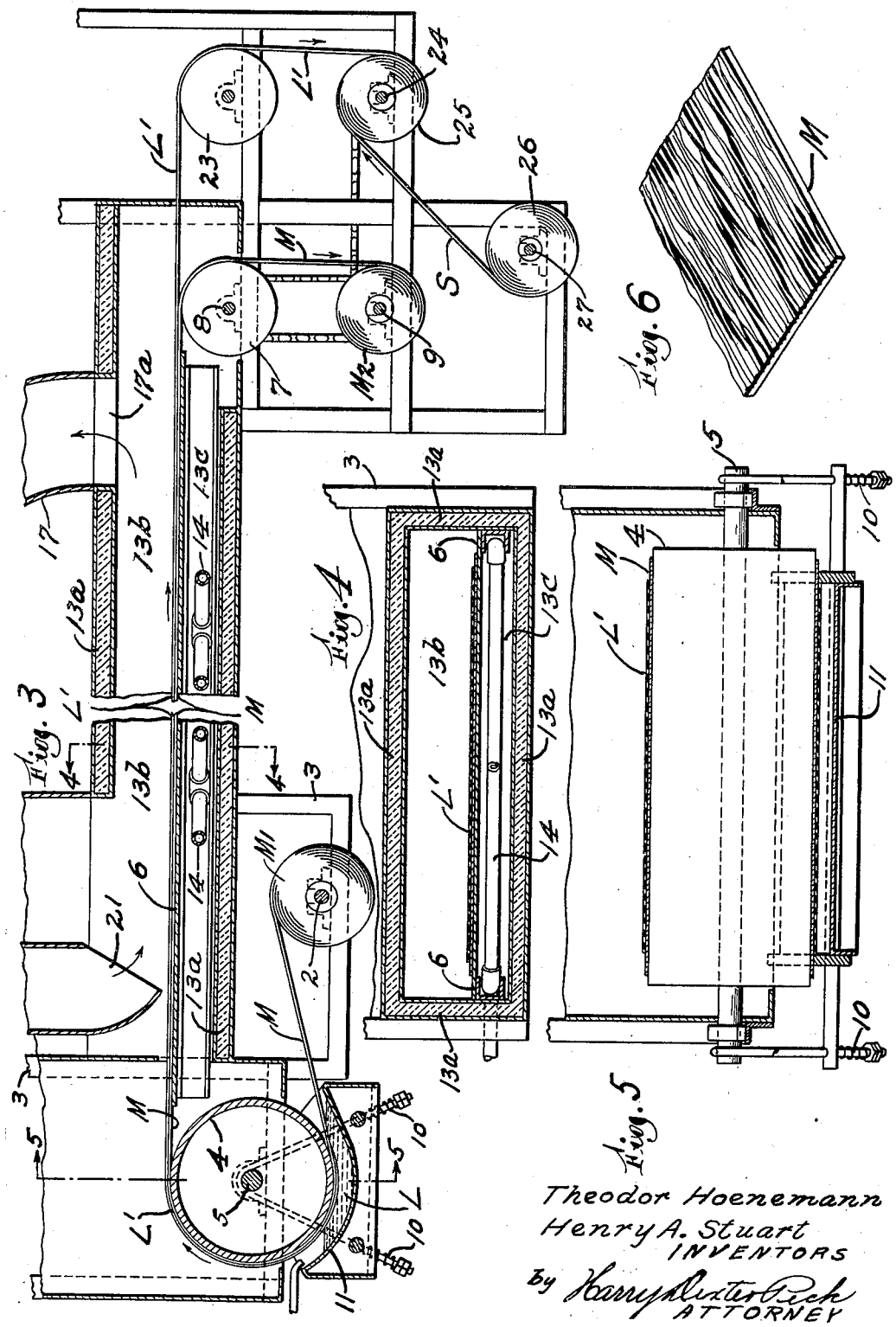

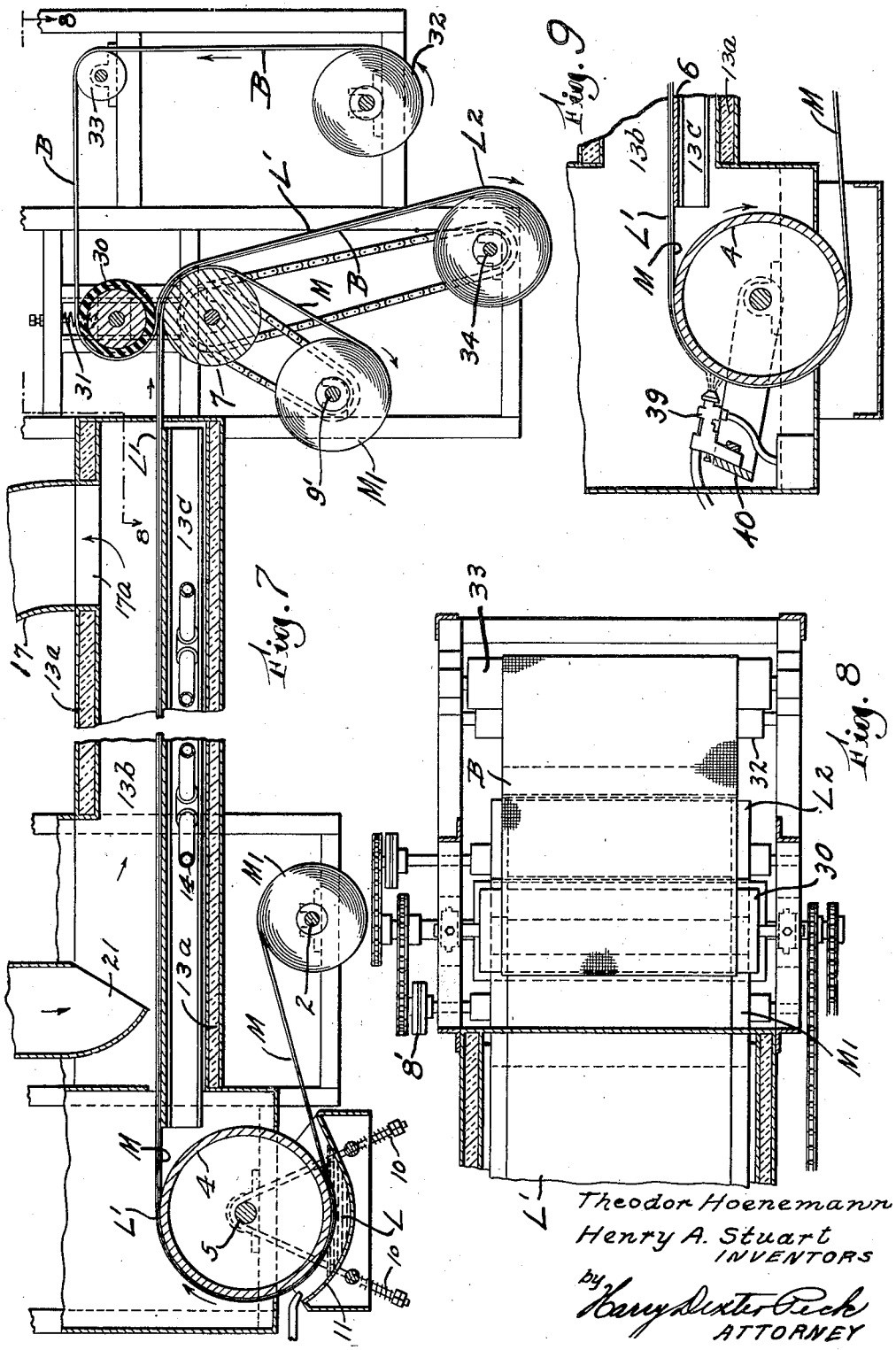

2,244,948

UNITED STATES PATENT OFFICE 2,244,948

METHOD AND MEANS FOR PROCESSING LATEX

Theodor Hoenemann, East Providence, and Henry A. Stuart, Providence, R. I., assignors to Goodyear Footwear Corporation, Providence, R. I., a corporation of Delaware Application October 31, 1938, Serial No. 237,938

3 Claims. (Cl. 18—15)

This invention relates to improvements in methods and means for processing latex. As illustrated herein, it relates more particularly to the formation from latex of a continuous strip of rubber material having, if desired, a backing or reinforcing layer attached to it.

One object of the present invention is to provide an improved method of forming a continuous strip of rubber material. To this end, one feature of the invention resides in continuously moving a matrix, applying a coating of latex to one surface of the matrix, subjecting the coating to heat, and separating the rubber coating from the matrix. As illustrated, the rubber material is wound in a roll following the separating operation and a separating layer of suitable material is inserted between the convolutions of the roll. If desired, this separating layer may be in the form of a reinforcing strip suitably prepared to adhere to the rubber material and become a backing or reinforcing layer or ply therefor.

Another object of the invention is to provide an improved apparatus by the use of which the improved method may be carried out.

As illustrated, the improved method comprises applying rubber latex to the surface of a continuously moving matrix, coagulating the latex by drying or by other suitable means, separating the dried or coagulated strip of rubber material from the matrix, winding the material in a roll and inserting either a separating strip or a layer of reinforcing material between the convolutions of the roll.

Apparatus by the use of which the improved method may conveniently be practiced comprises means for continuously moving the matrix through a bath of rubber latex, or past a series of spray nozzles, to form a layer or coating of the rubber latex on the surface of the matrix, a drying chamber for drying or coagulating the latex, means for passing the superimposed layer of latex and the matrix through said drying chamber, means for separating the rubber coating from the matrix, and means for winding the rubber material in a roll with a separating layer, either temporary or permanent in character, between the convolutions.

These and other objects and features of the invention will appear from the following description, reference being made to the accompanying drawings illustrating certain preferred forms of practicing the present invention.

In the drawings:

Figure 1 is a plan view of an apparatus for carrying out our improved method of processing latex;

Figure 2 is a view in side elevation of the apparatus shown in Figure 1;

Figure 3 is an enlarged cross-sectional view taken along the line 3—3 of Figure 1;

Figure 4 is a view in cross-section taken along the line 4—4 of Figure 3;

Figure 5 is a view in cross-section taken along the line 5—5 of Figure 3;

Figure 6 is a perspective view of a portion of the matrix;

Figure 7 is a view in cross-section similar to Figure 3 but showing a modified arrangement at the delivery end;

Figure 8 is a plan view taken partly in section along the line 8—8 of Figure 7; and Figure 9 is an elevation in section as on line 3—3 of Figure 1, but showing only one end of the apparatus and illustrating a modification of the method and means for applying the latex to the decorative matrix.

Referring now more particularly to the drawings, a matrix M is prepared from a strip of suitable material having preferably on one surface thereof a desired design as indicated in Figure 6. This matrix strip may be as long as desired, say several hundred feet, and is most conveniently handled by being wound on an arbor or shaft 2 in the form of a roll MI. The extending ends of this shaft are journaled on a frame 3 to permit the matrix to be easily unwound from its roll. The matrix strip is passed under and about half-way around a drum 4 mounted on shaft 5, also journaled on the frame 3. The matrix strip passes from the upper side of this drum onto a fixed bed or plate 6 along which the strip may easily slide until it leaves the plate to pass over and partly around a drum 7, whose shaft 8 is also pivotally mounted on the frame 3. Unless, as will later be described, the rubber strip is to be passed through the latex bath to make a heavier or thicker strip, the matrix passes to a wind-up arbor 9, where it is again wound into a roll M2.

It is to be understood, of course, that if the matrix has a decorative surface thereon, this decorative surface is on the outside of the matrix as it passes around the drum 4. Below this drum and suitably suspended from its shaft 5 by spring supports 10 is a trough 11 supplied with latex from a tank 12. The latex L is maintained at such a level that a portion of the drum is always submerged. As the matrix strip unwinds from its roll MI and passes thence to the drum, it likewise passes into the bath of latex which thereupon enters all the crevices and hollows of the decorative surface of the matrix and forms a continuous coating L' thereon. Neither the matrix nor the coating of latex are shown hatched in Figure 3 but it is to be understood that the matrix strip is clearly indicated as next to the surface of the drum and next to the surface of the plate 6, and that the coating of latex is next to the decorative surface of the matrix, which surface is the one removed from the surfaces of the said drum and plate.

As the matrix and its coating of latex move upward in the course of travel with the drum 4, the inherent tendency of the latex to flow downward is ordinarily sufficient to free any air bubbles which may have become entrapped in the latex. The attenuated film of latex over these bubbles readily gives way, as the latex slides on the air as it were, and the air escapes, leaving a coating substantially free from any bubbles whatever, and of remarkably uniform thickness.

The coated matrix now passes to the plate 6 and thence along through the drying chamber 13. This chamber, as indicated, is of considerable length, being slightly wider than the moving material and of comparatively shallow depth. Its walls 13a, as best seen in Figure 4, are heat insulated. The plate 6 separates the chamber 13 into an upper section 13b and a lower section 13c. In the latter are pipes 14 through which steam passes under pressure. These pipes may be arranged as desired, the arrangement shown having been found entirely satisfactory. This comprises several series of pipes (only one of which series is indicated in Fig. 1) extending slantwise across the lower section, with the entrance of each series connected to a supply pipe 15 and the exit of each series connected to a common waste pipe 16. The series of cross pipes nearest the entrance to the drying chamber first receives the steam and the subsequent series are later connected to the supply. This arrangement is desirable as the end of the drying chamber near its entrance should be highest in temperature with a more or less lowering temperature gradient obtaining toward its discharge end.

The upper section 13b of the drying chamber is supplied with a continuous current of hot air. This air is drawn to the left (Figures 1 and 2) through a duct 17 and flows into a heating chamber 18 where it passes through one or more banks of steam pipes 19, being thereby heated and thoroughly dried. The air passes thence through its propelling fan 20, from whose discharge nozzle 21 the air enters the upper section 13b and comes in intimate contact with the latex material just after the latter has entered the drying chamber. After flowing through this chamber absorbing moisture and, in cooperation with the heat from the steam pipes 14, effecting the drying of the rubber material, the air for the most part enters outlet 17a (the main entrance to duct 17) and is again drawn through the duct 17 to repeat its cycle. To compensate for such air as may escape through the openings at the ends of the drying chamber an auxiliary fan 22 (see Fig. 2) is provided to add fresh air to the duct 17.

As the dried rubber material and the matrix leave the plate 6, the matrix M as earlier described passes over and partly around drum 7, being thereby separated from the strip of rubber material L' which continues onward to another drum 23. There the rubber strip is directed downward to a wind-up arbor 24 journaled on the frame 3, and wound into a roll 25. In the arrangement shown in Figures 1 and 3 inclusive, a roll 26 of separating material S such as paper or the like is rotatable with a shaft 27 pivotally mounted on the frame 3. This separating strip S is interwound with the rubber material in roll 25 to prevent any adhesion between the coils of the latter. Later, as the rubber material is unwound for subsequent use the separating strip may be re-rolled and afterwards again used as a separating layer in another roll of rubber material.

If the rubber strip prepared as heretofore described is not as thick or as heavy as desired it may be made thicker as follows. Instead of separating the matrix M from the rubber strip L' as they reach roll 7, the two may be continued on to arbor 9 and wound together as a roll, the direction of winding being altered so that the matrix layer will be on the inside of each convolution. This roll may then be placed on shaft 2 and the composite strip, as it were, again fed over drum 4 and through the latex bath. This will add another layer of latex to the previous one and these two will intermingle and join to produce a thicker and heavier strip of uniform rubber material which can be separated from the matrix as earlier described and wound into a roll 25 with a separating strip S between the successive turns of the material.

When it is preferred to unite the strip of rubber material permanently with a backing strip of fabric or the like, the delivery end of the apparatus may be modified as shown in Figs. 7 and 8. In the arrangement shown, the matrix M leaves the roll 7 and passes thence to a wind-up arbor 9' and is wound into roll M1 as before. Above the roll 7 is mounted a pressure roll 30 which is movably mounted in suitable bearings which are urged toward the axis of roll 7 by springs 31. The pressure exerted by these springs may be adjusted. Mounted on the frame 3 is a supply roll 32 of fabric or other suitable backing material B, which is arranged to be led over a roll 33, and thence over roll 30 into engagement with the strip of rubber material L'. This backing material B has a surface suitably prepared with adhesive and when submitted to the pressure exerted by roll 30 is caused to adhere to the rubber strip. After the composite strip passes between the rolls 7 and 30, the matrix M is separated from the strip and passes to the wind-up arbor 9'. The composite strip of rubber L' and fabric backing B passes to an arbor 34 and is wound into a roll L2.

Under most operating conditions, it is desirable to control the temperature of the heated air at the point where it comes into engagement with the rubber strip as it enters the heating or drying chamber. To this end, there is provided a thermostat 35 (Fig. 2) which is located near the delivery end 21 of the air duct. This thermostat 35 controls electrically the opening and closing of a steam valve 36 which controls the amount of steam fed to the bank of steam coils 19. This thermostatically controlled valve is not described in detail herein since such valves are well-known in the art.

The shafts or arbors of the wind-up rolls are each sprocket and chain driven from the shaft 8 on which the roll 7 is mounted. In order to insure that these rolls are driven at the proper speeds, a slippable clutch of any well-known type may be used, such as is indicated at 8'. Due to the slipping action of such a clutch, the peripheral speed of the several rolls remains constant and the matrix and rubber strips are evenly wound without placing the matrix or rubber strip under excessive tension.

The machine is operated from a suitable source of power (not shown) through the chain 37 about a sprocket made fast to the end of the shaft 8. The roll 4 is positively driven from the shaft 8 by a chain 38.

Under some conditions, it is desirable to apply the latex to the matrix 1 by spraying the latex on the decorative surface. As shown in Fig. 9, the matrix M is passed about the drum 4 and the latex is applied to the matrix by a plurality of spray nozzles 39 which are mounted on a frame 40. The spray nozzles are so located that the latex is applied to the matrix before it reaches the top of the drum 4. After the spraying operation, the matrix passes through the drying chamber 13 in the same manner as hereinbefore described.

Any fumes or obnoxious gases arising from the latex bath or the sprayed latex may be withdrawn from the chamber 41 by a motor driven fan 42 and led to a point removed from the operators.

The best mode in which we contemplated applying the principles of our invention has been described in detail, but we do not desire to be limited thereto, because it is intended that the patent shall cover by suitable expression in the appended claims whatever features of patentable novelty exist in the invention.

We claim:

1. Apparatus for processing latex comprising, in combination, a trough holding a bath of latex, a rotatable drum arranged in said trough so that a portion of its circumference is submerged in said latex, a matrix strip having an impenetrable decorative surface, means for moving said strip around with the drum whereby a layer of latex is formed solely by adhesion with the decorative surface of the matrix, a drying chamber arranged to receive the matrix and its layer of latex from the drum, heating means associated with said chamber, including a heated plate along the surface of which the matrix slides and a blast of hot air directed against the latex film near the entrance of said chamber and continuing along the said film in the direction of its travel to close by the discharge end of the chamber, for drying the latex as it moves with the matrix through said chamber to form a strip of rubber material, and means near the discharge end of said chamber for separating the said strip from the matrix.

2. Apparatus for processing latex comprising a trough holding a bath of latex; a drum rotatable about a horizontal axis having its lower portion submerged in said latex; a matrix strip having an impenetrable decorative surface capable of picking up latex by adhesion; means for introducing said strip to said drum with its decorative surface outward whereby said strip moves with the drum through the latex bath and acquires solely by adhesion a film of latex on said decorative surface; a drying chamber with entrance adjacent the upper portion of said drum for receiving said strip and film of latex; a fixed plate separating said chamber into upper and lower sections and along the upper surface of which plate the said strip slides; means in the lower section of said chamber comprising a series of pipes extending under said plate and so connected to a source of steam that the steam enters the pipes near the entrance end of said chamber and flows in direction generally toward the discharge end of the chamber; means for causing a blast of hot air to enter the upper section of said chamber near its entrance end and flow along said upper section to close by the discharge end thereof; said arrangement of the flowing steam and hot air effecting a lowering temperature gradient in said chamber in the direction of travel of said strip for drying said latex as it moves with the strip thereby to form a strip of rubber material; and means at the discharge end of said chamber for separating said strip of rubber material from said matrix.

3. The method of processing latex which comprises applying uncoagulated latex by adhesion to the decorative surface of a matrix moving in a generally upward direction in order that the latex may tend to flow downward on itself and free any air bubbles entrapped in the latex, then moving said matrix and its adhering film of still uncoagulated latex in a horizontal direction with the said film uppermost and while so moving applying heat to the underside of said matrix and applying a blast of hot air to the exposed surface of the latex to extract water from the latex film and dry the latex to form a layer of rubber, followed by separating the said layer from the matrix.

THEODOR HOENEMANN.
HENRY A. STUART.